United States Patent [19]

Sailsbury

[11] Patent Number: 4,652,456

[45] Date of Patent: Mar. 24, 1987

[54] METHOD OF MAKING POPCORN BALLS

[76] Inventor: Lowell W. Sailsbury, 2009 68th St., Lubbock, Tex. 79412

[21] Appl. No.: 809,516

[22] Filed: Dec. 16, 1985

[51] Int. Cl.$^4$ ............................ A23B 7/16; A23L 1/18
[52] U.S. Cl. ..................................... 426/307; 426/309; 426/454; 426/512
[58] Field of Search ............... 426/302, 307, 309, 512, 426/454

[56] References Cited

U.S. PATENT DOCUMENTS

| 181,306 | 8/1876 | Blodget | 426/454 |
| 2,958,602 | 11/1960 | Gilmore | 426/307 |

Primary Examiner—George Yeung
Attorney, Agent, or Firm—Wendell Coffee

[57] ABSTRACT

Corn is popped, coated with caramel and cooled so that the caramel coating is hard and not sticky. The corn is loaded into molds in this condition and heated by blowing hot air over the corn so that the caramel coating is sticky. One or more blasts of air are jetted into the molds to stir the corn while heating. Then the molds are closed, compressing the corn into balls, cooled, and the balls ejected from the molds. Some parts of the molds are actuated by a cam surface wherein a roller follower is held against the cam surface by spring tension while other parts of the molds are actuated by air cylinder. A machine is illustrated with the mold units being mounted upon a circular mounting plate and rotated to six working stations with a dwell time at each working station.

8 Claims, 10 Drawing Figures

METHOD OF MAKING POPCORN BALLS

BACKGROUND OF THE INVENTION:

(1) Field of the Invention

This invention relates to food processing, and more particularly to making popcorn balls.

(2) Description of the Prior Art

Popcorn balls have been known as a food item for many years. The conventional way of making popcorn balls is to pour hot caramel syrup over popped popcorn and mold it into balls by hand. Traditionally, this is done in the home in the kitchen where the forming of the balls is a form of entertainment.

Presently, much of the popcorn is made in factories. I.e., the corn is popped in vast quantities and delivered in five gallon drums. Often it is sold two gallons at a time. Also, popcorn is often sold as caramel corn. In this case, the caramel is put on the corn, and the corn cooled, so that each kernel is separate and not stuck to additional kernels. The equipment for performing these tasks is known commercially and on the market.

However, the method and equipment for making popcorn balls is almost as primitive as the entertaining process conducted in the home kitchens for years.

Before my invention, commercially, the process was basically the same, except that instead of using the hands to form a mold, a pair of scoops or hand molds were used. These scoops or hand molds resembled a pair of ice cream scoops so that the corn was gathered by the scoops, the scoops pressed together and then opened to release the ball. Under commercial practice it was a batch process, whereas a batch or a bowl of popcorn was made, caramel was poured over it, stirred, and then the bowl of caramel corn was pressed into balls before the caramel cooled.

SUMMARY OF THE INVENTION

(1) New Functions and Surprising Results

I have developed a machine and method of operation for making popcorn balls. As a starting material, I use caramel coated popcorn, as is commercially available on the market. I.e., the initial steps of popping the corn and coating it with caramel and allowing the caramel to cool so that the coating on the popcorn is hard and not sticky is where my process begins. The cooled, coated popcorn is placed in a hopper where a predetermined amount necessary to make one single ball is measured. The measured corn is then placed into a mold. The mold includes a sliding part and a swinging part. After the corn has been placed in the mold and the mold partially closed, hot air is blown over the corn to heat the caramel coating until the coating is soft and sticky. The corn is stirred while heating so that the heat is distributed over all the kernels. Preferably, the stirring is done by jetting a blast of air into the mold by a small tube having a nozzle end directed toward the mold. Then, the mold is closed, compressing the corn into a spherical ball. Thereafter, the mold remains closed until the ball has cooled so that the caramel adheres the kernels of corn into a stable ball. Then, the mold is opened and the ball permitted to drop out. The mold is preferably coated with "TEFLON" to help prevent any caramel from sticking to the mold.

(2) Objects of this Invention

An object of this invention is to make popcorn balls.

Further objects are to achieve the above with a device that is sturdy, compact, durable, simple, safe, efficient, versatile, ecologically compatible, energy conserving, and reliable, yet inexpensive and easy to manufacture, adjust, operate and maintain.

Other objects are to achieve the above with a method that is rapid, versatile, ecologically, compatible, energy conserving, efficient, and inexpensive, and does not require highly skilled people to adjust, operate, and maintain.

The specific nature of the invention, as well as other objects, uses, and advantages thereof, will clearly appear from the following description and from the accomopanying drawing, the different views of which are not scale drawings.

Figure 1:
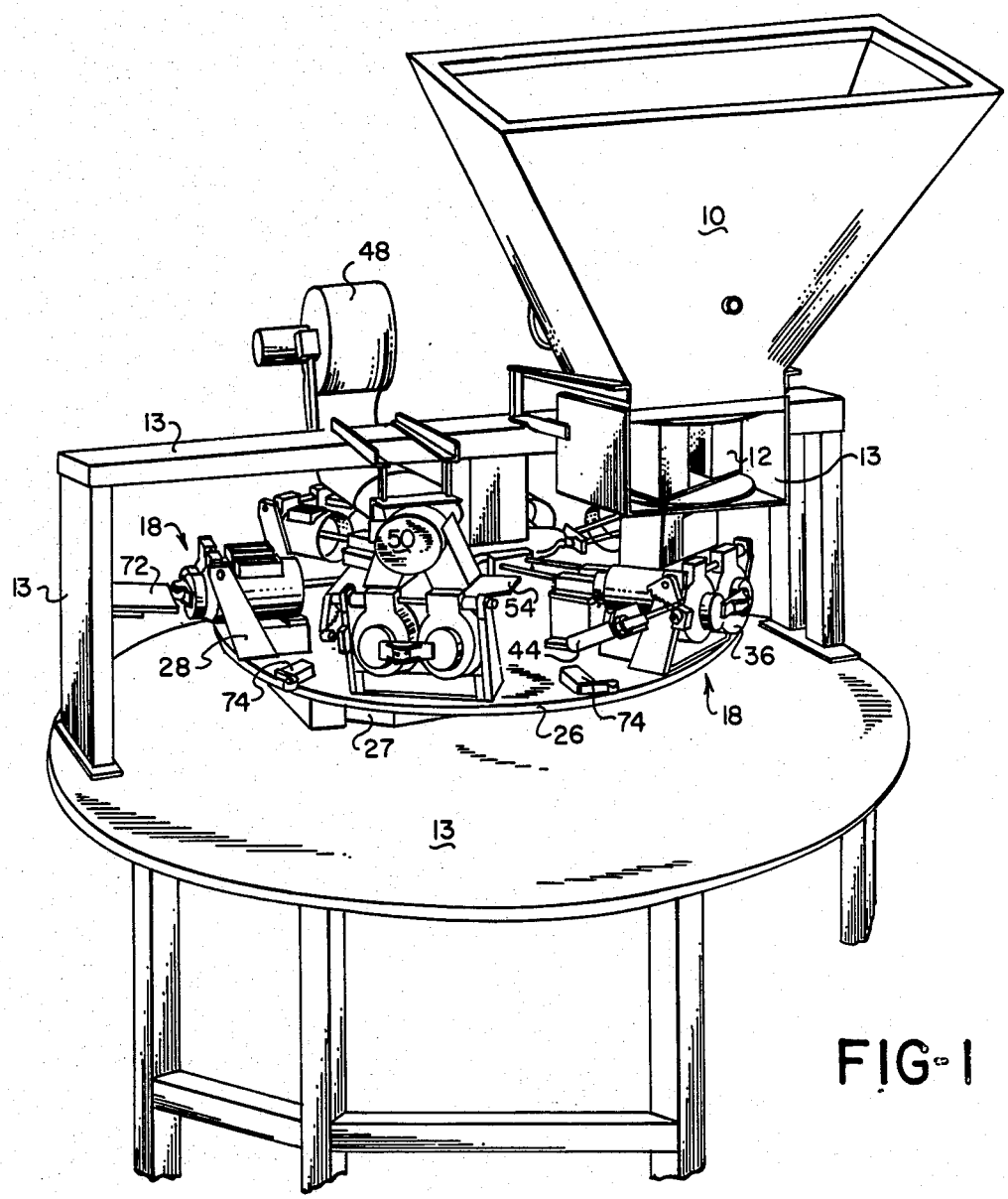
FIG. 1 is a perspective view of the machine with certain elements such as air hoses, electrical wires, heat insulation material omitted from clarity of illustration.

As an aid to correlating the terms describing this invention to the exemplary drawing, the following catalog of elements is provided:

10: Hopper
12: Measuring Boxes
13: Machine Frame
14: Flipper
16: Flipper Air Motor
18: Mold Unit
20: Vertical Shaft
22: Sector, Toothed
24: Rack
26: Mounting Plate
27: Index Table
28: Base
30: Cylinders
32: Sliding Mold
34: Ears
36: Swinging Mold
38: Swing Shaft
40: Sector
42: Rack
44: Mold Air Motor
46: Flange Rectangular Opening 48: Blower
50: Duct
52: Heater
54: Plate
55: Perforations
56: Cam Plate
58: Connecting Rod
60: Roller Head
62: Cam Roller
64: Bearing Block
66: Helical Tension Spring
68: Bridge Head
70: Pressure Roller
72: Pressure Plate
74: Eject Valve
76: Dash Line
78: Lever
80: Eject Plate
82: Stirring Paddles
84: Motor
86: Legs
88: Point Of Bifurcation
90: Perforations
92: Tub
94: Hose
96: Source
98: Nozzle
"A": Axis
"B": Arrow
"P": Popcorn Ball

DESCRIPTION OF THE PREFERRED EMBODIMENT

Referring to the drawings there may be seen a machine having a hopper 10 in which the cooled popcorn coated with hard and nonsticky caramel is placed. The hopper 10 is attached to the machine frame 13. The machine frame, or parts thereof, may be seen in FIGS. 1, 2, 3, 8, and 10. The frame 13 includes legs, a circular support, and a cross beam supported by suitable struts. Various parts of the frame have not been specifically identified since the frame is used to indicate that part of the apparatus which is rigid and unmoving.

Figure 4:
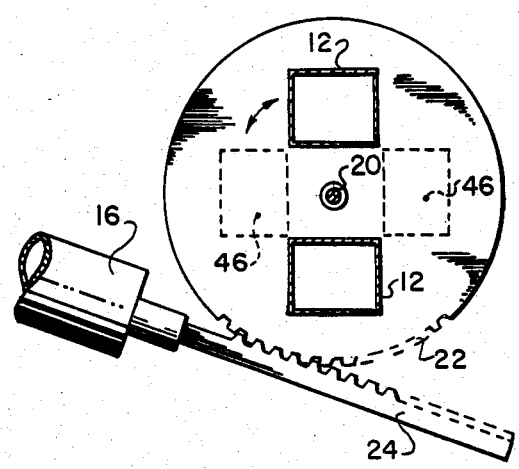
FIG. 4 is a plan sectional view of a portion of the measuring units taken substantially on line 4—4 of FIG. 3, also with a portion of the air motor and rack shown therein.
Figure 3:
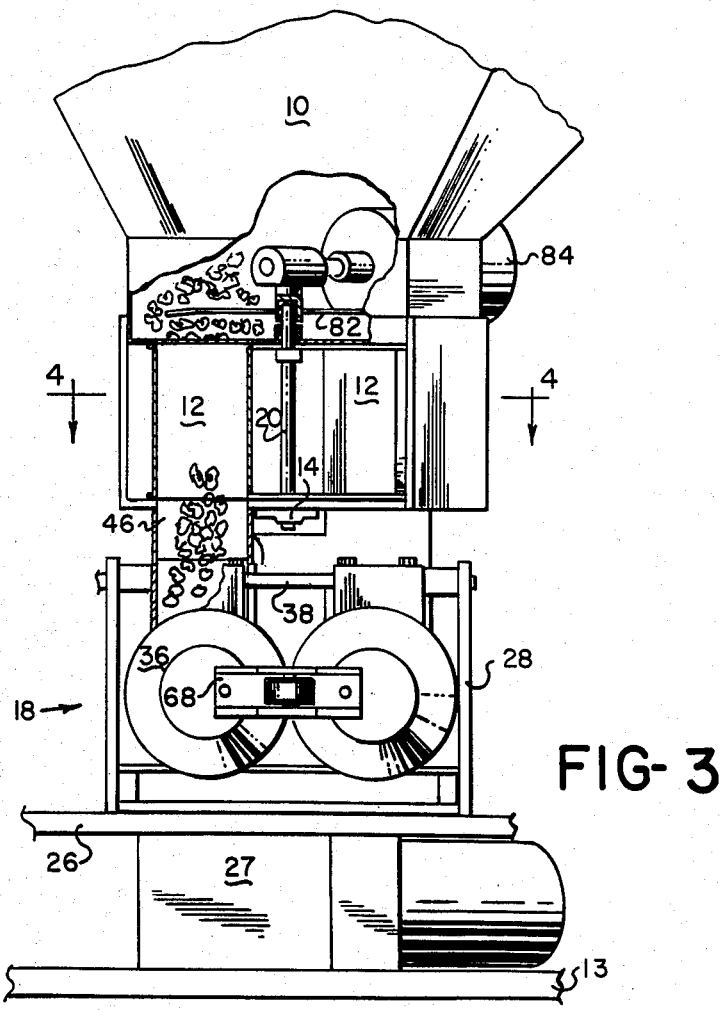
FIG. 3 is a partial elevational view of a mold unit being loaded at the load station with parts broken away to show interior construction.

A pair of measuring boxes 12 is at the bottom of the hopper 10 (FIGS. 3 and 4). The boxes are mounted upon a flipper 14 which is operated by measuring air cylinder or flipper air motor 16. The flipper 14 has two positions; one (FIG. 4), the loading position wherein the boxes 12 are immediately below the hopper 10, being loaded with cool, hard, nonsticky caramel; and two (FIG. 3), a dump position where the boxes 12 are above open molds of mold unit 18. The flipper 14 is mounted to rotate or oscillate about vertical shaft 20. Toothed sector 22 attached to the flipper 14 will rotate it through 90° responsive to movement by rack 24 connected to the air motor 16. The control to the air motor will be described later.

Figure 2:
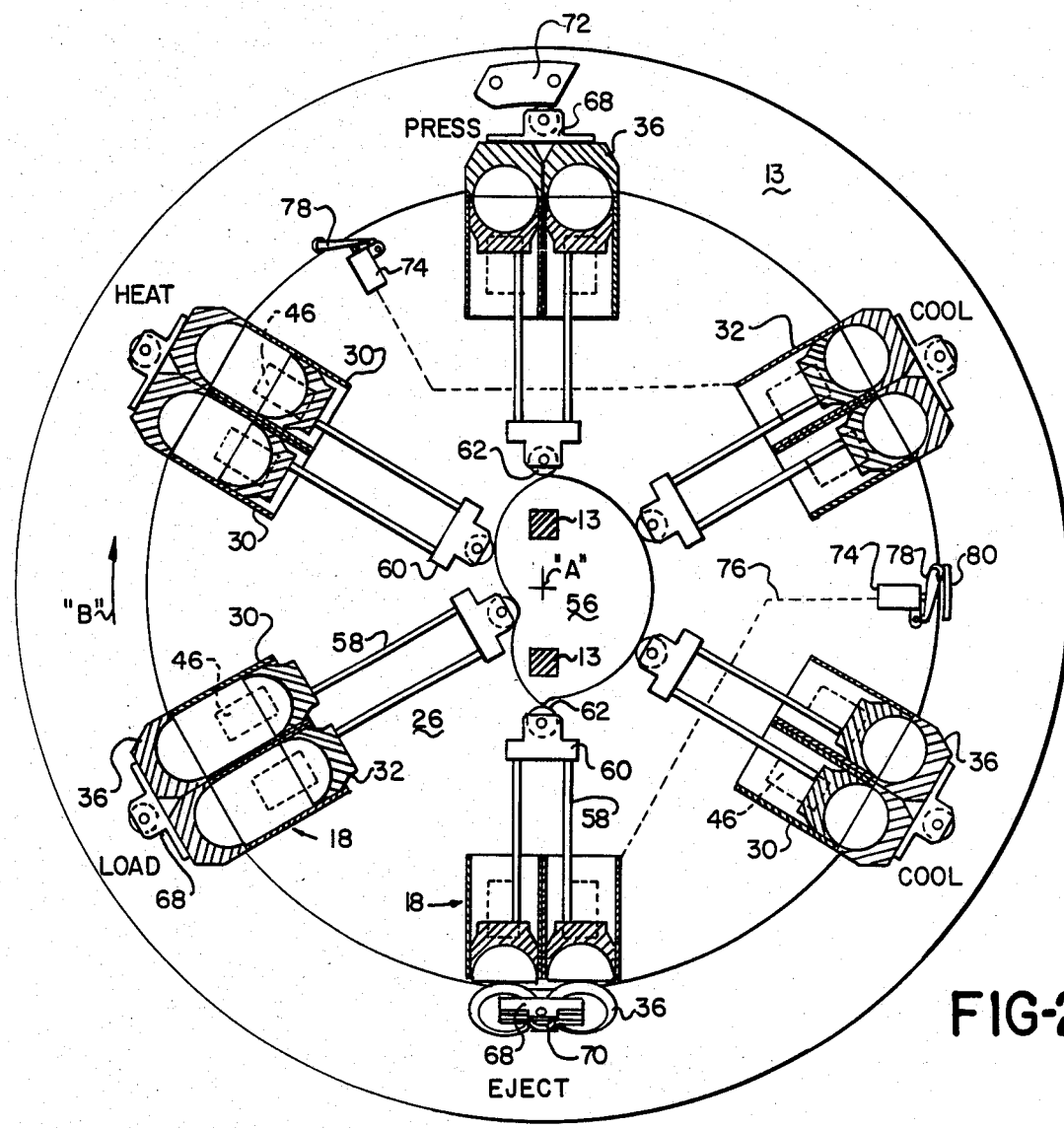
FIG. 2 is a sectional plan schematic view of the molds on the mounting plate which is based on the machine frame.
Figure 5:
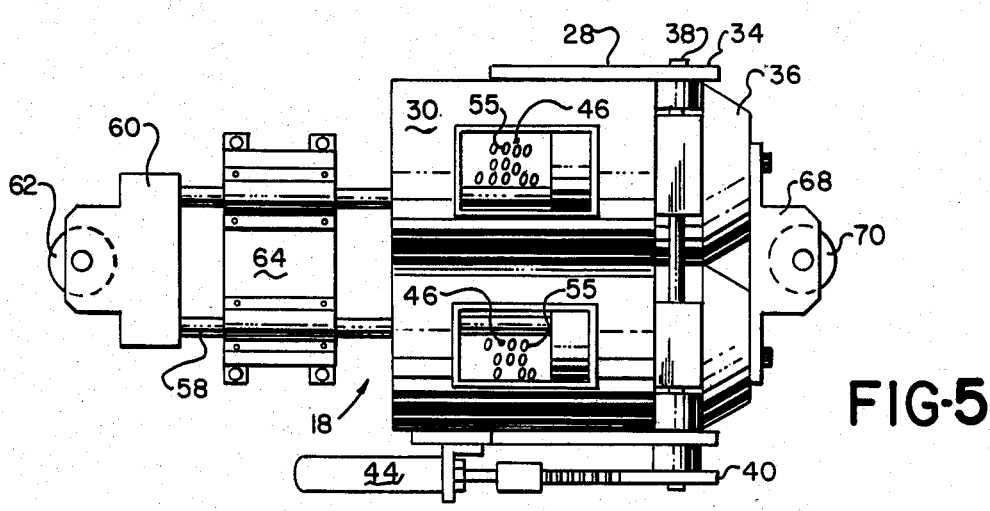
FIG. 5 is a top plan view showing a mold unit in the compression or cooling position.

The mold units 18 are mounted upon transfer means in the form of mounting plate 26 which is rotatable about its center (FIGS. 2 and 3). The mounting plate 26 is mounted on air powered indexing table 27 which is commercially available on the market. These indexing tables are air powered and are readily calibrated or set so that they rotate the table 60° in less than one second travel time so that each mold unit 18 stops at each of six areas, positions or stations. The amount of time or dwell time each mold unit 18 spends at each station can be adjusted.

The mold units, when at the load station, will be aligned with the measuring boxes 12 of the flipper 14.

These are six mold units 18 spaced upon the plate 26 (FIG. 2). Each mold unit 18 includes base 28 by which it is mounted to the plate 26. Two mold cylinders 30 are connected to each base 28. Each cylinder 30 functions as a cylindrical guide carrying traveling or sliding mold 32. The front or distal portion of the base 28 has ears 34 to which is pivoted swinging mold 36 (FIGS. 3, 5, 6, and 9). Swinging mold 36 is securely attached or pinned to pivot shaft or swing shaft 38. The swing shaft extends to the side of the housing 30 and has sector 40 attached to it. Sector 40 is rotated by rack 42 attached to mold air cylinder or motor 44. For clarity in drawing, the air hose connections to air motor 44 have not been shown nor have the air hose connections to the air motor 16 been shown. Those having ordinary skill in the art will understand how to connect the air hoses to the air motors and to the appropriate valves to cause the machine to function as described. Likewise, those having ordinary skill in the art would be able to connect the hoses from the valves to an appropriate source of air under pressure.

Each of the mold parts 32 and 36 have a cavity therein. When the mold parts are in the closed position, a ball shaped cavity is formed. The cavities are coated with "TEFLON" so that the caramel will not stick to the mold wherein it is in contact.

For convenience in manufacturing, it is preferable that each mold part has a hemispherical cavity therein, so that when the mold parts are closed, they form a sphere. However, it will be understood by those having ordinary skill in the art that the mold parts could be shaped otherwise so that when the mold parts are closed that the cavity between the two closed mold parts is more in the shape of a football or rugby ball. Those having ordinary skill in the art will understand that other shapes such as pear shaped or banana shaped could be formed; however, a spherical ball is the preferred shaped. The shapes of the pear or the like will be referred to a ball.

Flanged rectangular opening 46 is in the top of each cylinder 30. I prefer to place two mold cylinders on each mold unit to make twice as many popcorn balls on each revolution of the mounting plate yet not to complicate the mechanism excessively. The flanged rectangular openings fit immediately below the bottom of the flipper 14 to receive the measured amount of corn.

Figure 8:
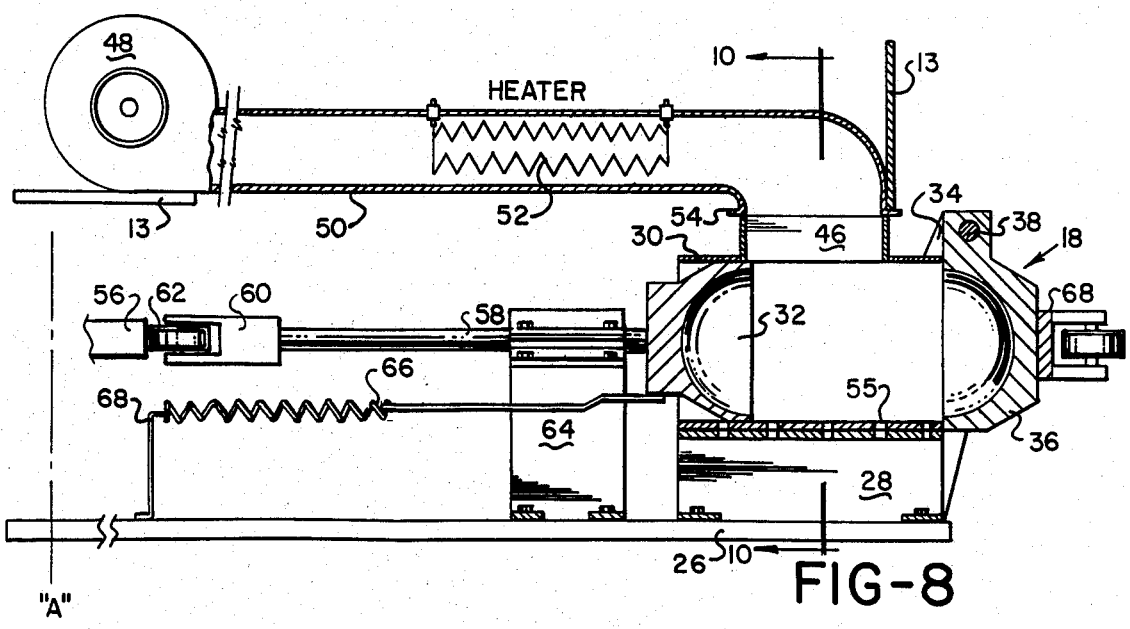
FIG. 8 is a sectional view of a mold in the open position with the heater, blower, and duct shown schematically for clarity of illustration.
Figure 10:
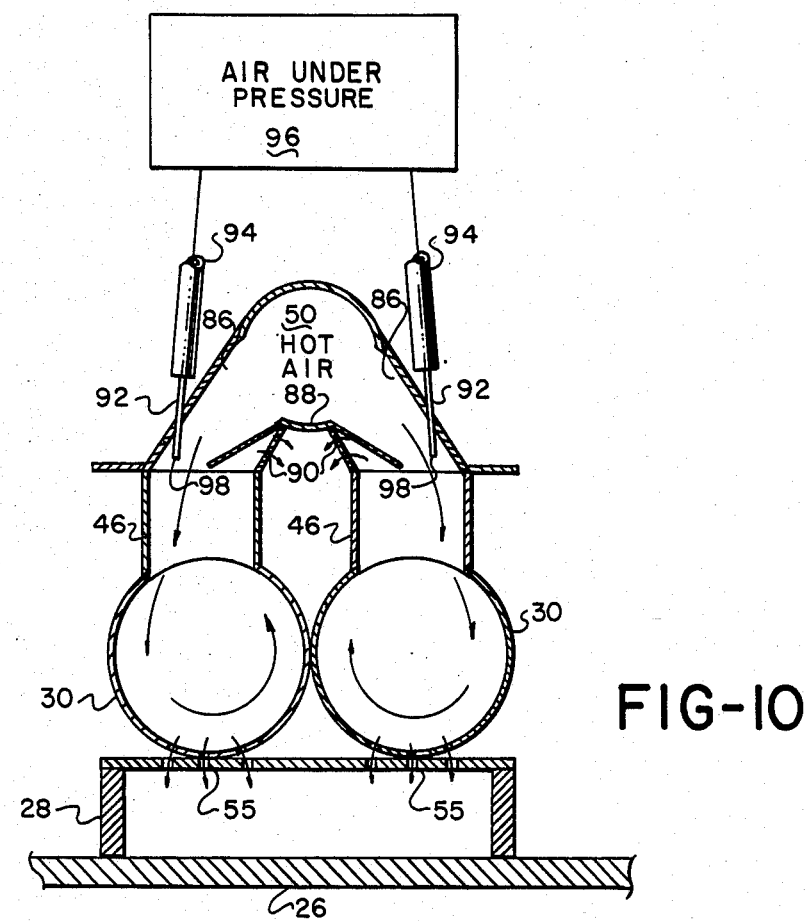
FIG. 10 is a sectional view of the mold showing the stirring and heating structure taken substantially on line 10—10 of FIG. 8.

Air fan or blower 48 is mounted upon the machine (FIGS. 1 and 8). The outlet of the blower is connected into insulated duct 50. Electrical heater 52 is mounted within the duct 50. Therefore, the fan, duct, and heater form parts of a means for blowing the air. The outlet of the duct 50 is at rectangular plate 54 which has two rectangular apertures therein. These two rectangular apertures fit at the top of the the two flange rectangular openings 46 when the each mold unit 18 is at the heat station (FIGS. 1 and 10). A plurality of circular holes or perforations 55 are drilled through the bottom of the cylinders 30 and through that portion of the base 28 below the cylinders 30, so that the hot air from the duct 50 may circulate through the open molds and out the perforations 55.

Referring particularly to FIG. 10, it may be seen that the air flow into the units is restricted. I.e., that the duct 50 is bifurcated--there are two legs 86. From point of bifurcation 88 to the midpoint of the top of the flanged opening 46, a baffle extends to form a restricted passageway so that only half the area of the opening 46 has hot air flowing to it from the duct 50 and the legs 86. Therefore, it may be seen that the air tends to flow through the mold in a circular fashion, first going down the outside of the mold and some air exiting through the perforations 55 in the bottom of the mold and then circulating on up so that the remaining hot air flows through perforations 90 in the inside portion of each of the legs 86, as illustrated.

Structure is provided for stirring for the kernels of the corn while they are in the mold being heated. This structure provides a blast of air which is jetted into the mold causing the corn to be agitated or mixed or stirred. Specifically, small diameter metal tube 92, is inserted through the outer portion of each of the legs 86. The tube is connected by hose 94 to source of air under pressure 96. The exit portion of the tube 92 forms nozzle 98. It is from this nozzle, which is directed toward the mold, that a blast of air under pressure is jetted into the mold to produce the stirring of the popcorn.

As a preferred form, a blast of air from a source of about 50 lbs./sq. in. (psi) would be released for about 1/10 of a second. This would occur at least once during the heating, and according to the preference of the operator, more than once. The tube 92 has an inside diameter of about 1/16 inch. Those having ordinary skill in the art will know how to connect the necessary valves to produce the momentary blast of air at any prescribed time desired during the dwell time of the rotation of the table 27 and mounting plate 26.

According to this invention, I adjust the dwell time until the proper amount of hot air is blown through the corn until the caramel is soft and sticky and sticks together properly when compressed. Commercially available indexing table 27 forms a part of a transfer means for indexing or moving or transferring the mold units 18. The dwell time of the plate 27 and the plate 26 is adjusted so that there is ample time to soften the corn.

It is necessary that the caramel to be sufficiently soft and sticky so that the individual kernels of corn adhere into a stable ball upon cooling and pressing. This is primarily accomplished by heat in the hot air. However, the humidity within the air also affects the stickiness or adhesion capabilities of the caramel. Also, different recipes of caramel have different adhering qualities. Those having ordinary skill in the art will understand that these factors must be considered and are, to some extent, controllable. E.g., humidity may be added into the means for blowing hot air. With certain recipes of caramel, and with certain climatic conditions, stable balls have been made with a dwell time of 6 seconds on the machine illustrated and described in detail.

Also, those with skill in the art will understand that with very slight modifications, additional areas could be provided for heating. Specifically, the compression could occur while the table is moving from what is presently the compression station to the first cooling station, and then the corn heated not only at the present heating station, but also what is now designated as the press station.

The mounting plate 26 is mounted and rotates about an axis "A" (FIG. 2). Immediately above the mounting plate at the axis of its rotation, cam plate 56 is permanently mounted to the machine frame 13. Cam plate 56 is at the same level as the axis of the cylinders 30 (FIG. 8).

Each of the sliding molds 32 has a connecting rod 58 attached to it (FIGS. 5-8). These connecting rods attach to the pair of sliding molds 32, which is attached to a single base 28, are connected to roller head 60. Cam follower or roller 62 is journaled to the roller head 60 and also is in operational relationship and contact with cam plate 56.

Bearing block 64 is attached to the mounting plate 26. The connecting rods 58 are mounted for reciprocal movement through the bearing block. Helical tension spring 66 is attached to each of the sliding molds 32. The spring 66 extends from the sliding mold to connection 68 located at the center of the mounting plate 26. Therefore, analysis will show that the two springs 66 for each mold unit 18 will hold the roller 62 firmly against the cam plate 56.

It is noted that the connecting rods 58 are not mounted at the center of the sliding molds 32 but are mounted toward one side thereof. This is necessary because otherwise, the roller head 60 would interfere with the roller head of the adjacent mold unit 18 in certain positions of operation as may been seen in FIG. 2.

Referring to FIG. 2 for the operation of the cam 56 and the sliding mold 32, it may be seen that in the load position that the cam roller 62 is extended to a point closest to the axis "A" of any point. I.e., in this position, the sliding mold 32 is in its most open position. As the mounting plate rotates in the direction of arrow "B", the sliding mold partially closes. The partial closing is begun at this point so that the entire movement does not occur in the 60° travel between the heat station and the press station. Therefore, at the heat station, the sliding mold will be in a position between the open position and the closed position. From the heat station, the cam will cause the roller to advance to a full closed position. This is the position in which the popcorn ball will be compressed. The cam is circular about the axis "A" from the press station to the eject station. I.e., there is no movement of the sliding mold from the time of compression to ejection. At the eject station, there is a "kick" or slight protuberance to the cam which causes the sliding mold to move a slight bit more to aid in the ejection of the popcorn ball "P" in the event that the popcorn ball tends to stick within the sliding mold 32. From the eject station to the load station, in this 60° movement, the cam moves to its lowest position and the sliding mold 32 moves again to the full open position.

As previously described, the swing mold 36 is moved from an open position to a closed position by air motor 44. To prevent undue strain upon the air motor 44, the rack 42 and the sector 40, an additional mechanism is used on compression. The two swing molds 36 are connected by bridge head 68. Pressure roller 70 is journaled to the bridge head 68. Upon a stationary portion of the machine frame 13, a pressure plate 72 is mounted.

The pressure of the popcorn forming the popcorn ball "P" increases as the roller 62 rolls upon the cam plate 56. As the mold unit 18 approaches the press station, the swing molds 36 may tend to move distally of the axis "A". However, the pressure roller 70 bears against the pressure plate 72 to counteract these forces so that there would be no outward movement of the swing molds 36 and the bridge heads 68. As soon as the popcorn is pressed and the sliding molds 32 have moved to the full closed position, there no substantial force thereafter upon the swing mold 36 and the sector 40; and therefore, the backup plate or pressure plate 72 is no longer needed. I.e., in cooling stations and the travel from the press station to the cooling station, just the normal force between the sector 40 and the rack 36 is sufficient to maintain the swing molds in position.

Figure 9:
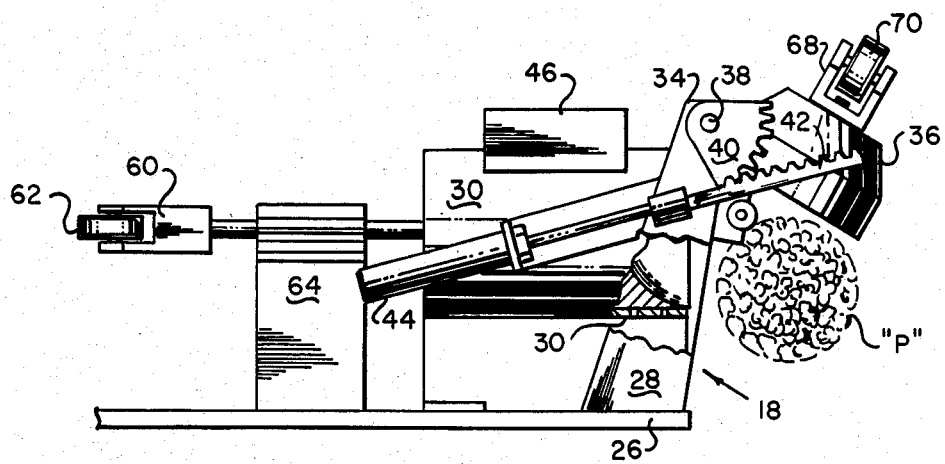
FIG. 9 is a side elevational of a mold in the eject position with parts broken away for illustration purposes.
Figure 6:
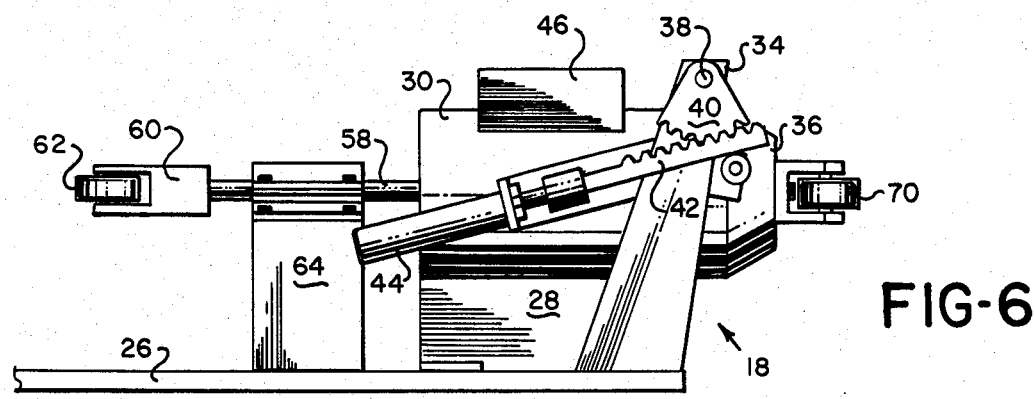
FIG. 6 is a side elevational view of a pair of molds in the compressed position.
Figure 7:
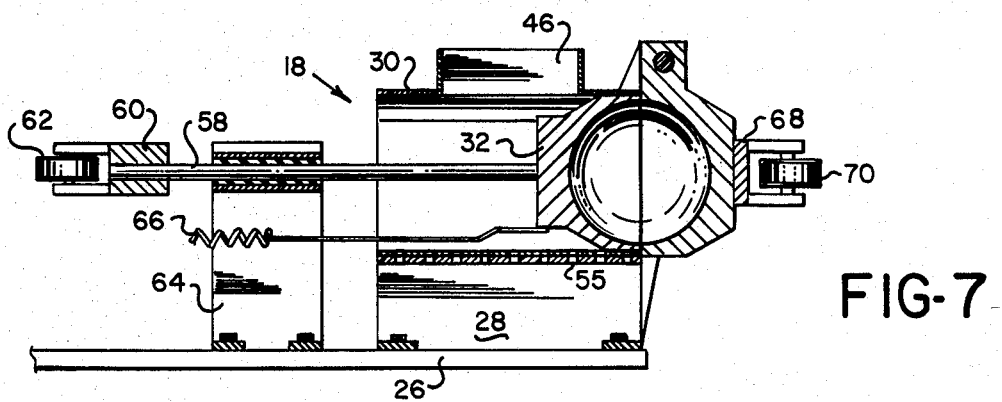
FIG. 7 is a sectional view of a mold in the compressed position.

A source of air under pressure is supplied to the mounting plate 26. The air is connected by hose, as within the skill in the art, to each of the eject valves 74. There are six eject valves 74 upon the mounting plate, each connected by hose, shown by dash line 76 to an air motor 44 (FIG. 2). However, for the purpose of clarity and simplicity of illustration, only two eject valves 74 have been shown in FIG. 2. The normal position of the air motor 44 is in the contracted position as seen in FIG. 6. In the contracted position, the swinging mold 36 is closed. However, when the valve 74 is actuated, the motor 44 extends to open the mold 36 into the open or eject position (FIG. 9). The eject valve 74 is a simple lever valve which has a roller on the end of its lever 78. Eject plate 80 is mounted on the stationary part of the frame 13 for the machine in any convenient location. Eject valve 74 is placed upon the mounting plates 26 so that as the mold unit corresponding to the eject valve 74 is approaching the eject station, the mold will be open. Therefore, as shown in FIG. 2, the eject plate is located at a position 90 on the machine from the eject station. As the mounting plate 26 rotates and the mold unit approaches the eject station, the lever 78 of the eject valve 74 will approach the eject plate 80 so that the valve 74 is actuated and the air motor 44 is actuated to open the swinging mold 36 before the mold unit 18 reaches the eject station. The mold units 36 will remain in the open position during the entire time at the eject station, and particularly, the swing molds 36 will be open at the time the sliding molds 32 receive the "kick" from the projection upon the cam 56.

Operation

Although the operation has basically been described above, the operation will be described at this time.

The controls for the air powered indexing table 27 are set to the desired amount.

With the controls properly adjusted, as described above, as each mold unit 18 reaches the load station, the flipper will be actuated. The flipper 14 is actuated by the air motor 16. The air motor receives its supply of air from the central control unit so that at each time, the index table 27 is in the dwell condition, that air is supplied to the motor 16 to move the flipper so that the measuring boxes 12 are aligned with the flanged rectangular openings 46. Then, when the unit is in the moving position, the flipper 14 moves back so that the measuring cylinders or boxes 12 are beneath the hopper. The measuring boxes will be filled from the hopper, and it will be particularly noted that there is the stirring paddles 82 in the bottom of the hopper 10 for this purpose. The stirring paddles 82 rotate coaxial with the vertical shaft 20 and are rotated by suitable means, such as electric motor 84.

It will be seen that the hopper 10, stirring paddles 82, flipper 14, etc. are all parts of a means for loading a measured amount of popcorn into the open molds at the load station.

Next, each of the molds, in turn, after it is loaded, move to the heat station where the hot air from the means for heating is blown through the corn in the open mold.

It will be understood that the blower 48, duct 50, and heater 52 are parts of a means for heating the caramel coating on the popcorn by blowing hot air over it while at the heat station.

Also, it will be understood that the tube 92, with its nozzle 98 connected to the source of air under pressure 96, forms portions of a means for stirring the corn and the kernels thereof while it is at the heat station or area.

Next, the cam 54 and the roller 62 of each of each mold unit riding against the cam, will cause the mold to completely close. Analysis will show that it is not necessary for the molds to be in a dwell position at a station at the time they reach the fully closed position, but this fully closed position could be at any point between dwell stations. It is desirable to have pressure plate 72 at the position the molds completely close as described above.

Thereafter, there is no change in the cam to the eject station, nor is there other particular operations occurring upon the corn except that the caramel will cool so that it is ready to be ejected from the mold.

As each of the mold units 18 approaches the eject station, the lever 78 of the valve unit 74 will approach the ejection plate 80, and upon engagement of the lever 78 with the ejection plate 80, will actuate the mold air motor 44 to open the mold. There will be the "kick" on the cam at the eject station to cause the sliding molds 32 to "kick" the ball from the mold.

Not all of the details of construction have been shown in the drawings or described in the specifications since they would be well known to those having ordinary skill in the art. E.g., the details of the construction of the index table 27 and its controls have not be shown since these items are commercially available upon the market. Likewise, the methods of furnishing air under pressure to the valves 74 have not been shown since transferring air from a stationary frame to a rotating table are well known, and swivel heads for this specific purpose are commercially available on the market. Similarly, the taps for obtaining the air to operate the flipper air motor 16 have not been shown, since those having ordinary skill would understand how to connect taps to the control units of the index head.

The embodiment shown and described above is only exemplary. I do not claim to have invented all the parts, elements or steps described. Various modifications can be made in the construction, material, arrangement, and operation, and still be within the scope of my invention.

Some examples of the modifications that can be made within the scope of my invention are such that the mold units 18 could move continuously rather than being indexed to certain stations wherein they stop at each station. Analysis of the machine will show that there is no particular need to stop the molds at any particular station except at perhaps the load station, and if the loading mechanism were synchronized to move with the mold units for a short time during the loading process, obviously, it would not be necessary to stop the mold units at the load station. In such an arrangement, the measuring boxes 12 would move with the mold units for a short period of time while the mold units were being loaded. Likewise, those having skill in the art will understand that it is not necessary to have the mold units traveling in a circular path mounted on a rotating mounting plate. E.g., the mold units could readily be mounted upon a track or moved by a chain along a path where different functions were performed. Also, the parts could be moved by means other than the cams or air motors as have been described, all as within the skill of those which are engaged in the art. However, the embodiment illustrated is the preferred embodiment at the time of filing the application. Also, it will be understood that the flipper 14 could be rotated otherwise. E.g., rotatable reversible air motors are available which could be used through right angle gears to drive a pinion connected to shaft 20 rather than the use of the section 22, rack 24, and air motor 16 as illustrated.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. The method of making popcorn balls comprising:
    a. popping corn to a state of popped corn, then
    b. coating the popped corn with a caramel coating, next
    c. cooling the coated, popped corn until the coating is hard and nonsticky, next
    d. measuring a predetermined amount of cool, coated, popped corn into a mold, then
    e. heating the coating on the popped corn while in the mold until the coating is soft and sticky, then
    f. compressing the coated, popped corn into a ball, then
    g. cooling the coating of the compressed popped corn until it is hard while in the mold, then
    h. removing the compressed popped corn ball with the hardened coating from the mold.
2. The method as defined in claim 1 with the additional limitation of:
    i. stirring the popcorn while heating.
3. The method as defined in claim 1 having all the limitations a. through h., wherein the heating step specified above is by:
    i. blowing hot air into the mold.
4. The method as defined in claim 3 with the additional limitation of:
    j. stirring the popcorn while heating.
5. The method as defined in claim 4 wherein said stirring is accomplished by:
    k. jetting a blast of air into the mold.
6. The method as defined in claim 1 having all the limitations a. through h., wherein the compressing and the removing steps defined above are by:
    i. closing movable parts of the mold, and
    j. opening movable parts of the mold.
7. The method as defined in claim 6 having all the limitations a. through j., wherein the heating step specified above is by:
    k. blowing hot air into the mold.
8. The method as defined in claim 7 with the additional limitation of:
    l. stirring the popcorn while heating, by
    m. jetting a blast of air into the mold.

* * * * *